(12) United States Patent
Behroozi

(10) Patent No.: US 9,847,828 B2
(45) Date of Patent: Dec. 19, 2017

(54) ADJUSTING BEAM WIDTH OF AIR-TO-GROUND COMMUNICATIONS BASED ON DISTANCE TO NEIGHBOR BALLOON(S) IN ORDER TO MAINTAIN CONTIGUOUS SERVICE

(71) Applicant: X Development LLC, Mountain View, CA (US)

(72) Inventor: Cyrus Behroozi, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 705 days.

(21) Appl. No.: 14/132,584

(22) Filed: Dec. 18, 2013

(65) Prior Publication Data

US 2016/0226573 A1 Aug. 4, 2016

(51) Int. Cl.
*H04B 7/185* (2006.01)
*H01Q 1/28* (2006.01)
(Continued)

(52) U.S. Cl.
CPC .......... *H04B 7/18506* (2013.01); *H01Q 1/28* (2013.01); *H04B 7/18504* (2013.01);
(Continued)

(58) Field of Classification Search
CPC ... H04W 24/02; H04W 16/24; H04W 64/003; H04W 16/28; H04W 84/06; H04W 24/04;
(Continued)

(56) References Cited

U.S. PATENT DOCUMENTS 6,018,659 A * 1/2000 Ayyagari ........... H04B 7/18504
342/450
6,195,037 B1 * 2/2001 Gross .................... H04B 7/2041
342/354

(Continued)

FOREIGN PATENT DOCUMENTS

WO 0124600 4/2001

*Primary Examiner* — Vladimir Magloire
*Assistant Examiner* — David Orange
(74) *Attorney, Agent, or Firm* — McDonnell Boehnen Hulbert & Berghoff LLP

(57) ABSTRACT

Example methods and systems for adjusting the beam width of radio frequency (RF) signals for purposes of balloon-to-ground communication are described. One example method includes determining, based on respective locations of a plurality of balloons and areas covered by respective ground-facing communication beams of the balloons, a contiguous ground coverage area served by the plurality of balloons, where the communication beam of a balloon defines a corresponding individual coverage area within the ground coverage area, determining a change in position of at least one of the balloons, based on the change in position of the at least one balloon, determining an adjustment to a first of the individual coverage areas in an effort to maintain the contiguous ground coverage area after the change in position of at least one of the balloons, and adjusting a width of the ground-facing communication beam of the balloon corresponding to the first individual coverage area in order to make the determined adjustment to the first individual coverage area.

10 Claims, 11 Drawing Sheets

(51) Int. Cl.
*H04W 72/04* (2009.01)
*H04W 64/00* (2009.01)
*H04W 16/26* (2009.01)
*H04B 7/26* (2006.01)

(52) U.S. Cl.
CPC .......... *H04B 7/2606* (2013.01); *H04W 16/26* (2013.01); *H04W 64/003* (2013.01); *H04W 72/046* (2013.01)

(58) Field of Classification Search
CPC ............... H04W 40/20; H04B 7/18513; H04B 7/18506; H04B 7/18504; H04B 7/18515; H04B 7/18539; H04B 7/2041; H04B 7/185; H04B 7/18508; H04B 7/18517; H04B 7/18528; H04B 7/18502; H04B 7/1851; H04B 1/745; H04B 7/0408; H04B 7/18554; H04B 7/18578
USPC .......... 455/431, 446, 12.1, 13.3, 25
See application file for complete search history.

(56) References Cited

U.S. PATENT DOCUMENTS

| | | | | |
|---|---|---|---|---|
| 6,418,327 | B1* | 7/2002 | Carey | H04W 16/06 455/422.1 |
| 6,512,934 | B2* | 1/2003 | Ihara | H01Q 1/246 455/562.1 |
| 6,628,941 | B2 | 9/2003 | Knoblach et al. | |
| 7,403,772 | B2 | 7/2008 | Myer | |
| 7,567,779 | B2 | 7/2009 | Seligsohn | |
| 7,801,522 | B2 | 9/2010 | Knoblach et al. | |
| 8,078,162 | B2 | 12/2011 | Deaton | |
| 8,116,763 | B1 | 2/2012 | Olsen | |
| 9,281,554 | B1* | 3/2016 | Behroozi | H01Q 1/28 |
| 9,300,388 | B1* | 3/2016 | Behroozi | H04B 7/18504 |
| 2002/0167702 | A1 | 11/2002 | Badesha et al. | |
| 2004/0072570 | A1* | 4/2004 | Smith | H04B 7/2041 455/446 |
| 2005/0014499 | A1* | 1/2005 | Knoblach | B64B 1/40 455/431 |
| 2006/0126524 | A1* | 6/2006 | Tateson | H04L 45/02 370/252 |
| 2008/0018524 | A1* | 1/2008 | Christianson | G01S 7/4026 342/75 |
| 2008/0075467 | A1* | 3/2008 | Mickley | B64D 39/00 398/131 |
| 2009/0023477 | A1* | 1/2009 | Staudte | H04W 16/28 455/562.1 |
| 2009/0135076 | A1* | 5/2009 | Foo | H01Q 1/246 343/836 |
| 2011/0034191 | A1 | 2/2011 | Leabman | |
| 2011/0100201 | A1 | 5/2011 | Bass | |
| 2013/0179008 | A1 | 7/2013 | Devaul et al. | |
| 2013/0303218 | A1* | 11/2013 | Teller | H04L 47/829 455/507 |
| 2014/0099122 | A1* | 4/2014 | DeVaul | H04B 10/118 398/124 |
| 2014/0333491 | A1* | 11/2014 | Behroozi | H01Q 1/1264 343/706 |
| 2015/0309157 | A1 | 10/2015 | Knoblach et al. | |

* cited by examiner

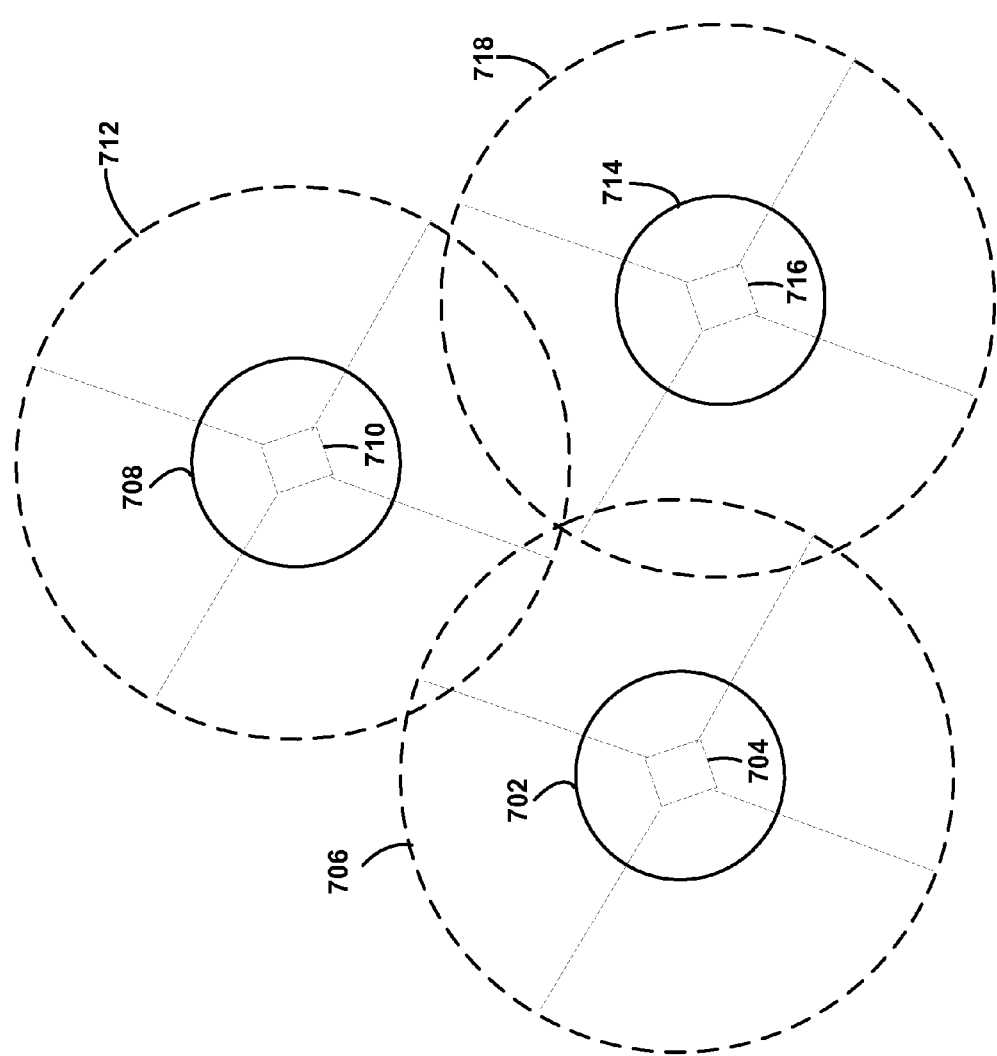

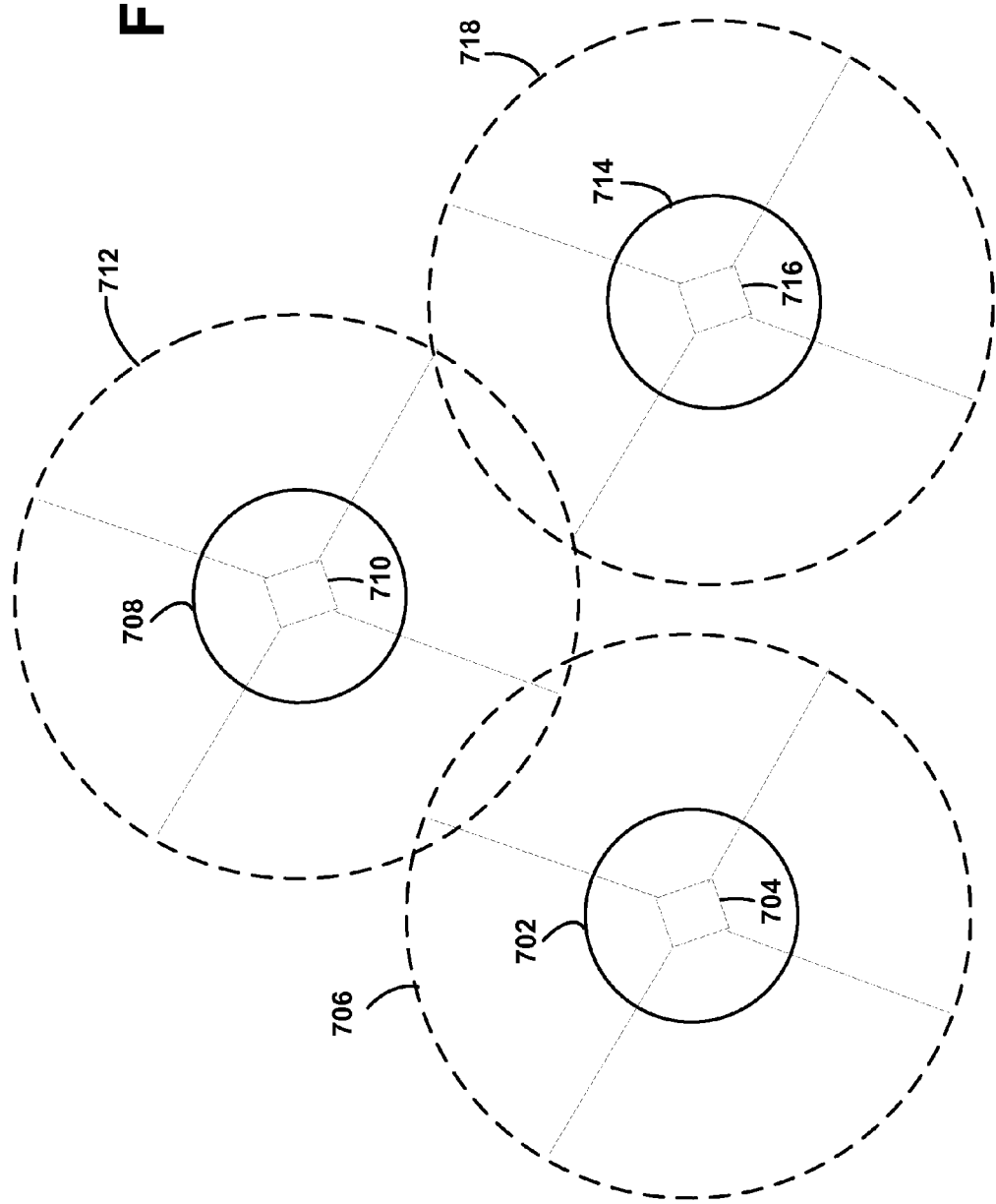

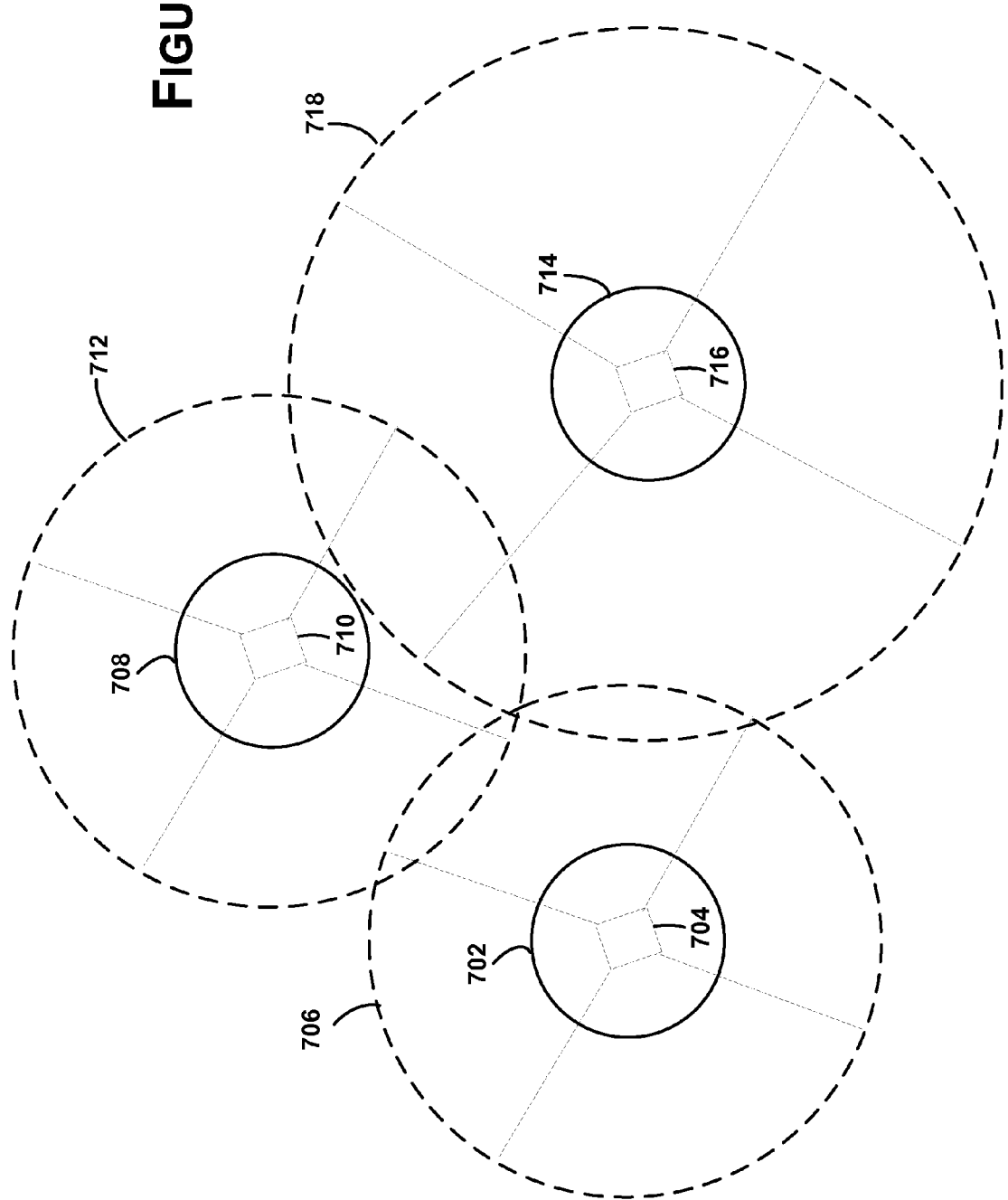

ADJUSTING BEAM WIDTH OF AIR-TO-GROUND COMMUNICATIONS BASED ON DISTANCE TO NEIGHBOR BALLOON(S) IN ORDER TO MAINTAIN CONTIGUOUS SERVICE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Example methods and systems for adjusting the beam width of radio frequency (RF) signals for purposes of balloon-to-ground communication are described. An example balloon may be capable of transmitting ground-facing communication signals with different beam widths in order to cover different areas on the ground. An example group of balloons, such as balloons operating as part of a balloon network, may provide service to a contiguous coverage area on the ground. Movements of one or more of the balloons may be determined that might cause a gap in coverage. In order to maintain contiguous coverage, the beam width of one of the balloons may be adjusted to change the individual coverage area of the balloon.

In one example, a method is provided that includes determining, based on respective locations of a plurality of balloons and areas covered by respective ground-facing communication beams of the balloons, a contiguous ground coverage area served by the plurality of balloons, where the communication beam of a balloon defines a corresponding individual coverage area within the ground coverage area, determining a change in position of at least one of the balloons, based on the change in position of the at least one balloon, determining an adjustment to a first of the individual coverage areas in an effort to maintain the contiguous ground coverage area after the change in position of at least one of the balloons, and adjusting a width of the ground-facing communication beam of the balloon corresponding to the first individual coverage area in order to make the determined adjustment to the first individual coverage area.

In another example, a system is provided that includes a plurality of balloons, and a control system configured to determine, based on respective locations of the balloons and areas covered by respective ground-facing communication beams of the balloons, a contiguous ground coverage area served by the balloons, where the communication beam of a balloon defines a corresponding individual coverage area within the ground coverage area, determine a change in position of at least one of the balloons, based on the change in position of the at least one balloon, determine an adjustment to a first of the individual coverage areas in an effort to maintain the contiguous ground coverage area after the change in position of at least one of the balloons, and provide instructions to adjust a width of the ground-facing communication beam of the balloon corresponding to the first individual coverage area in order to make the determined adjustment to the first individual coverage area.

In a further example, a non-transitory computer readable medium having stored therein instructions that when executed by a computing system, cause the computing system to perform functions is disclosed. The functions may include determining, based on respective locations of a plurality of balloons and areas covered by respective ground-facing communication beams of the balloons, a contiguous ground coverage area served by the plurality of balloons, where the communication beam of a balloon defines a corresponding individual coverage area within the ground coverage area, determining a change in position of at least one of the balloons, based on the change in position of the at least one balloon, determining an adjustment to a first of the individual coverage areas in an effort to maintain the contiguous ground coverage area after the change in position of at least one of the balloons, and adjusting a width of the ground-facing communication beam of the balloon corresponding to the first individual coverage area in order to make the determined adjustment to the first individual coverage area.

In yet another example, a system may include means for determining, based on respective locations of a plurality of balloons and areas covered by respective ground-facing communication beams of the balloons, a contiguous ground coverage area served by the plurality of balloons, where the communication beam of a balloon defines a corresponding individual coverage area within the ground coverage area, means for determining a change in position of at least one of the balloons, based on the change in position of the at least one balloon, means for determining an adjustment to a first of the individual coverage areas in an effort to maintain the contiguous ground coverage area after the change in position of at least one of the balloons, and means for adjusting a width of the ground-facing communication beam of the balloon corresponding to the first individual coverage area in order to make the determined adjustment to the first individual coverage area.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 7A illustrates a top view of a configuration of three balloons and corresponding communication beams, according to an example embodiment.

FIG. 7B illustrates a top view of another configuration of three balloons and corresponding communication beams, according to an example embodiment.

FIG. 7C illustrates a top view of yet another configuration of three balloons and corresponding communication beams, according to an example embodiment.

DETAILED DESCRIPTION

I. Overview

Figure 1:
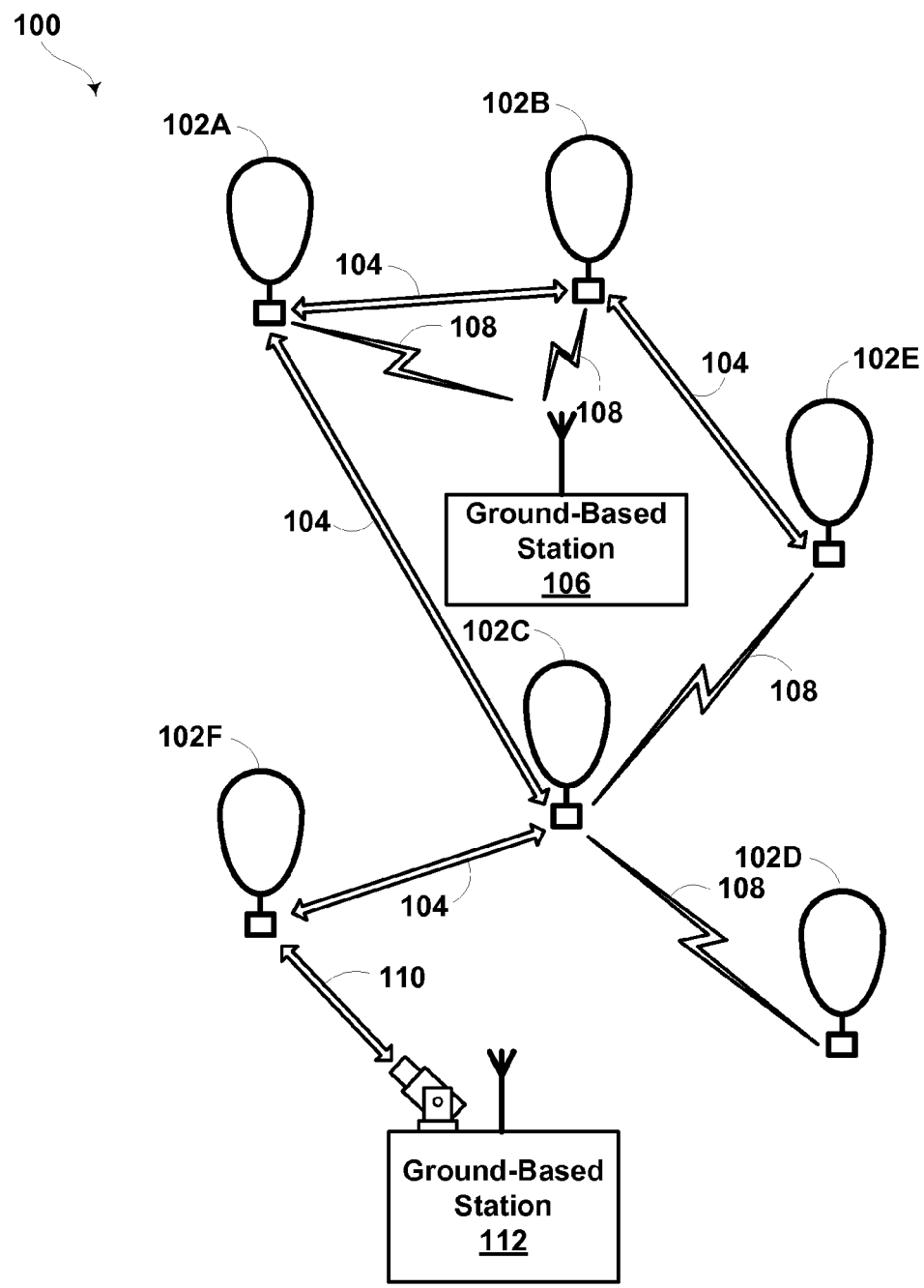
FIG. 1 is a block diagram illustrating an example balloon network.

Examples of methods and systems are described herein. It should be understood that the words "example" and "exemplary" are used herein to mean "serving as an example, instance, or illustration." Any embodiment or feature described herein as "exemplary" is not necessarily to be construed as preferred or advantageous over other embodiments or features. The example or exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Example embodiments relate to an aerial communication network using a plurality of balloons with communication equipment to facilitate wireless communication among the balloons and with ground-based stations and/or other ground subscribers. Balloons can be formed of an envelope supporting a payload with a power supply, data storage, and one or more transceivers for wirelessly communicating information to other members of the balloon network and/or to wireless stations located on the ground. To communicate with ground-based stations and/or other ground subscribers while aloft, the balloons can be equipped with one or more radio frequency (RF) antennas mounted to the balloon payload so as to be ground-facing.

In particular, one or more transceivers may be used by a balloon to transmit and/or receive communication data to and/or from ground-based stations and/or other ground subscribers located within a certain area underneath the balloon at ground level. In some examples, a group of neighboring balloons may provide contiguous coverage at ground level. For instance, service may be provided from at least one balloon within a network of balloons to subscribers located on the ground anywhere within a region.

In general, the beam width of a ground-facing RF communication signal may be inversely proportional to the strength of the signal at ground level. A narrowly focused beam (e.g., from a high-gain antenna on a balloon) may provide a stronger signal, while a broader beam (e.g., from a low-gain antenna on a balloon) may spread out the power over a larger area and therefore may not provide as strong a signal. Accordingly, in some examples, a group of balloons may provide coverage over an area with minimal overlap between areas covered by neighboring balloons in order to provide a strong signal (and/or a signal with a high signal-to-noise ratio) to ground-based subscribers.

In some instances, one or more balloons within a network may change position in a way that may create a gap in coverage at ground level. For example, one or more of the balloons could change horizontal (latitudinal and/or longitudinal) position and/or altitude. A balloon may change position based on factors partially or completely outside the control of the balloon network (e.g., wind) and/or may be controlled to change position based on fleet planning algorithms which may be used to position balloons within the network. The change(s) in position may change the areas covered by each of the balloons on the ground based on the current beam widths of ground-facing communication beams in use by the balloons. In some instances, a determination may be made (either before a change in position occurs, during the change in position, or after the change in position) that a gap may occur in the ground coverage provided by the balloon network.

In such circumstances, the beam width of a ground-facing communication signal from one or more balloons may be adjusted in an effort to maintain contiguous coverage on the ground. For instance, if neighboring balloons travel far away from a particular balloon, the balloon may increase its beam width to increase its coverage area (e.g., to provide coverage to areas that were previously covered by other balloons). In other examples, neighboring balloons may travel close to a particular balloon, such as when each of the balloons is assigned to help provide coverage to a highly populated area (e.g., a sporting event). In such an instance, the particular balloon may decrease the beam width of its ground-facing communication signal to decrease the size of its coverage area and provide a stronger signal to a smaller area on the ground, for example.

A balloon may be equipped to adjust the beam width of a ground-facing RF communication beam in different ways. In one example, a beam width may be adjusted by selecting from two or more discrete antennas, each capable of transmitting a signal with a different beam width. For instance, a balloon may be equipped with two different RF antennas: one high-gain antenna for transmitting narrow RF beams and one low-gain antenna for transmitting broader RF beams. In further examples, a balloon may be equipped with three or more different antennas, each capable of transmitting an RF signal with a different beam width. In other examples, the beam width of a balloon may be continuously adjustable, such as by adjusting the spacing between a radiator and a ground-facing reflector that may operate to reflect a communication beam toward the ground.

In additional examples, a balloon network may service ground subscribers with a level of demand that varies based on location (e.g., a highly populated area may have greater demand than an area with fewer people). In such examples, the beam widths of one or more balloons may be controlled and/or adjusted in order to provide a certain amount of coverage to particular areas on the ground based on demand level. For instance, each balloon may have a limited capacity of data that it can transmit to ground subscribers (e.g., 10 MB/s). One or more balloons covering an area with a certain demand level (e.g., 100 MB/s) may change position so that the balloons may no longer provide enough coverage to satisfy the demand level using the current beam widths. In such circumstances, one or more balloons may adjust the beam widths of their ground-facing communication signals in order to satisfy the demand for coverage at ground level.

Example systems and methods therefore may allow for RF communication from a group of balloons to ground-based stations and/or other ground subscribers. A balloon may adjust the beam width of a ground-facing communication beam based on changes in position of one or more of the balloons.

II. Example Balloon Networks

In order that the balloons can provide a reliable data network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations.

Further, in an exemplary balloon network, the balloons may communicate with one another using free-space optical communications. For instance, the balloons may be configured for optical communications using ultrabright LEDs or possibly lasers for optical signaling (although regulations for laser communications may restrict laser usage). In addition, the balloons may communicate with ground-based station(s) using radio-frequency (RF) communications.

In some embodiments, a high-altitude-balloon network may be homogenous. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. (Note also that some balloons may be configured to function as both a super-node and a sub-node.)

In such a configuration, the super-node balloons may be configured to communicate with nearby super-node balloons via free-space optical links. However, the sub-node balloons may not be configured for free-space optical communication, and may instead be configured for, e.g., RF communications. Accordingly, a super-node may be further configured to communicate with nearby sub-nodes using RF communications. The sub-nodes may accordingly relay communications from the super-nodes to ground-based station(s) using RF communications. Configured as such, the super-nodes may collectively function as backhaul for the balloon network, while the sub-nodes function to relay communications from the super-nodes to ground-based stations.

FIG. 1 is a simplified block diagram illustrating a balloon network 100, according to an exemplary embodiment. As shown, balloon network 100 includes balloons 102A to 102E, which are configured to communicate with one another via free-space optical links 104. Configured as such, balloons 102A to 102E may collectively function as a mesh network for packet-data communications. Further, balloons 102A to 102D may be configured for RF communications with ground-based stations 106 via RF links 108.

In an exemplary embodiment, balloons 102A to 102E are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102E may generally be configured to operate at altitudes between 17 km and 22 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 22 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 22 km.

To transmit data to another balloon, a given balloon 102A to 102E may be configured to transmit an optical signal via an optical link 104. In an exemplary embodiment, a given balloon 102A to 102E may use one or more high-power light-emitting diodes (LEDs) to transmit an optical signal. Alternatively, some or all of balloons 102A to 102E may include laser systems for free-space optical communications over optical links 104. Other types of free-space optical communication are possible. Further, In order to receive an optical signal from another balloon via an optical link 104, a given balloon 102A to 102E may include one or more optical receivers. Additional details of balloons implementations are discussed in greater detail below, with reference to FIG. 3.

In a further aspect, balloons 102A to 102D may utilize one or more of various different RF air-interface protocols for communication ground-based stations 106 via RF links 108. For instance, some or all of balloons 102A to 102D may be configured to communicate with ground-based stations 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an exemplary network may also include downlink balloons, which provide a high-capacity air-to-ground link.

For example, in balloon network 100, balloon 102E is configured as a downlink balloon. Like other balloons in an exemplary network, a downlink balloon 102E may be operable for optical communication with other balloons via optical links 104. However, a downlink balloon 102E may also be configured for free-space optical communication with a ground-based station 112 via an optical link 110. Optical link 110 may therefore serve as a high-capacity link (as compared to an RF link 108) between the balloon network 100 and a ground-based station 108.

Note that in some implementations, a downlink balloon 102E may additionally be operable for RF communication with ground-based stations 106. In other cases, a downlink balloon 102E may only use an optical link for balloon-to-ground communications. Further, while the arrangement shown in FIG. 1 includes just one downlink balloon 102E, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of or in addition to a free-space optical communication system. The high-bandwidth RF communication system may take the form of an ultra-wideband system, which provides an RF link with substantially the same capacity as the optical links 104. Other forms are also possible.

Ground-based stations, such as ground-based stations 106 and/or 108, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102E over an RF link 108. As such, a ground-based station 106 may be configured as an access points via which various devices can connect to balloon network 100. Ground-based stations 106 may have other configurations and/or serve other purposes without departing from the scope of the invention.

Further, some ground-based stations, such as ground-based station 108, may be configured as gateways between balloon network 100 and one or more other networks. Such a ground-based station 108 may thus serve as an interface between the balloon network and the Internet, a cellular service provider's network, and/or other types of networks. Variations on this configuration and other configurations of a ground-based station 108 are also possible.

A. Mesh-Network Functionality

As noted, balloons 102A to 102E may collectively function as a mesh network. More specifically, since balloons 102A to 102E may communicate with one another using free-space optical links, the balloons may collectively function as a free-space optical mesh network.

In a mesh-network configuration, each balloon 102A to 102E may function as a node of the mesh network, which is operable to receive data direct to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

Further, in order to operate as a mesh network, balloons 102A to 102E may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102E move relative to one another and/or relative to the ground. Accordingly, an exemplary balloon network 100 may apply a mesh protocol to update the state of the network as the topology of the network changes. For example, to address the mobility of the balloons 102A to 102E, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102E may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for improving QoS may be employed when determining a lightpath. Other techniques are also possible.

B. Station-Keeping Functionality

In an exemplary embodiment, a balloon network 100 may implement station-keeping functions to help provide a desired network topology. For example, station-keeping may involve each balloon 102A to 102E maintaining and/or moving into a certain position relative to one or more other balloons in the network (and possibly in a certain position relative to the ground). As part of this process, each balloon 102A to 102E may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such case, a given balloon 102A to 102E may implement station-keeping functions to position itself at substantially the same distance (or within a certain range of distances) from adjacent balloons in the balloon network 100.

In other cases, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an exemplary balloon network may be dynamic and adaptable. In particular, station-keeping functionality of exemplary balloons may allow the balloons to adjust their respective positioning in accordance with a change in the desired topology of the network. For example, one or more balloons could move to new positions to increase or decrease the density of balloons in a given area. Further, in some embodiments, balloons may be in continuous or nearly continuous motion, and station-keeping may involve moving balloons so as to try to meet certain requirements for e.g., coverage in various areas.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
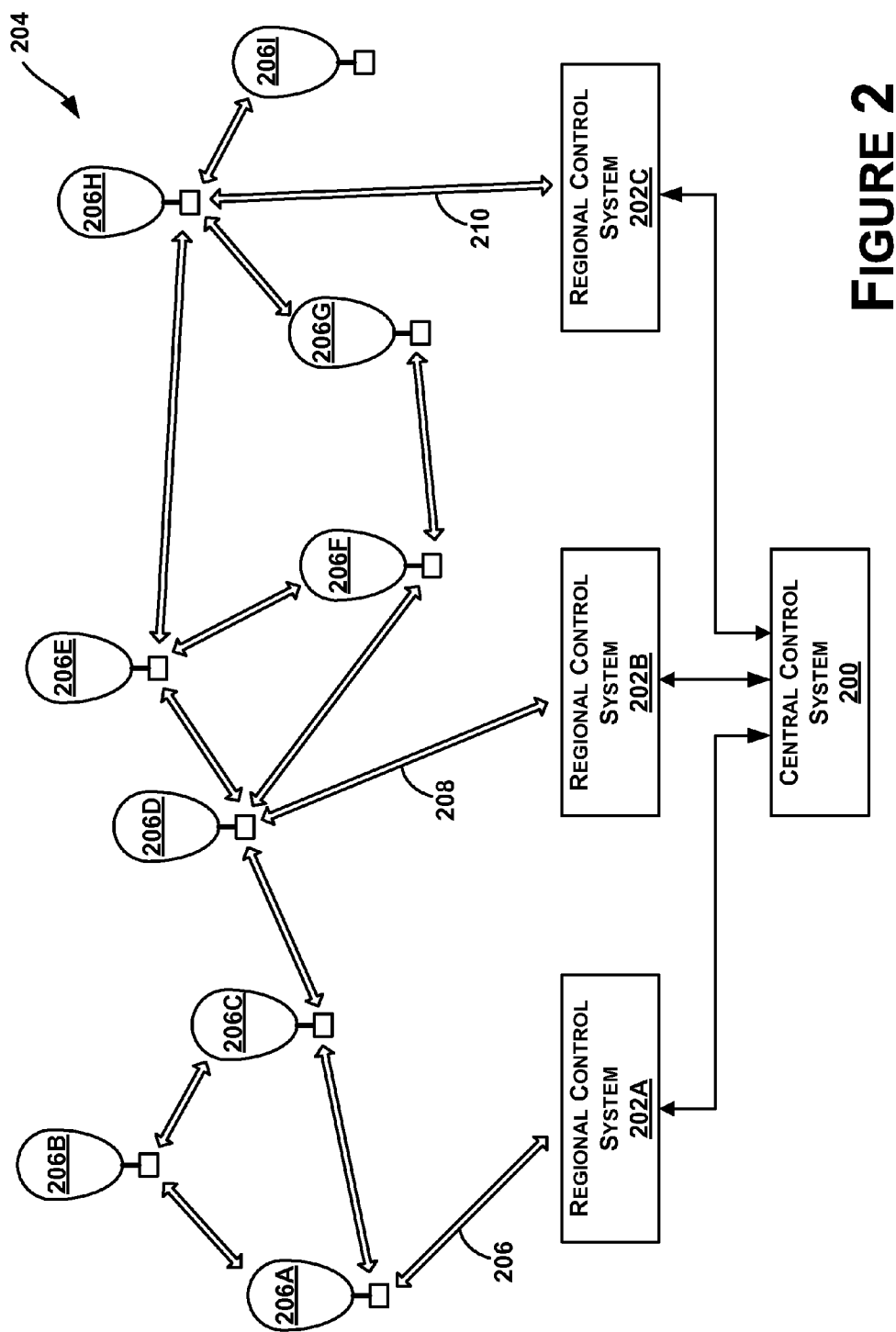
FIG. 2 is a block diagram illustrating an example balloon-network control system.

In some embodiments, mesh networking and/or station-keeping functions may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In the illustrated configuration, where only some of balloons 206A to 206I are configured as downlink balloons, the balloons 206A, 206D, and 206H that are configured as downlink balloons may function to relay communications from central control system 200 to other balloons in the balloon network, such as balloons 206B, 206C, 206E to 206G, and 206I. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202B may in fact just be particular type of ground-based station that is configured to communicate with downlink balloons (e.g., such as ground-based station 112 of FIG. 1). Thus, while not shown in FIG. 2, the control system shown in FIG. 2 may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

As noted, FIG. 2 shows a distributed-control arrangement, with regional control systems 202A to 202C coordinating communications between a central control system 200 and a balloon network 204. Such an arrangement may be useful in a balloon network that covers a large geographic area. In some embodiments, a distributed control system may even support a global balloon network that provides coverage everywhere on earth. Of course, a distributed-control arrangement may be useful in other scenarios as well.

Further, it should be understood that other control-system arrangements are possible. For instance, some implementations may involve a distributed control system with additional layers (e.g., sub-region systems within the regional control systems, and so on). Alternatively, control functions may be provided by a single, centralized, control system, which communicates directly with one or more downlink balloons.

In a further aspect, control and coordination of a balloon network may be shared between a ground-based control system and a balloon network to varying degrees, depending upon the implementation. In fact, in some embodiments, there may be no ground-based control system. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

D. Illustrative Balloon Configurations

Figure 3:
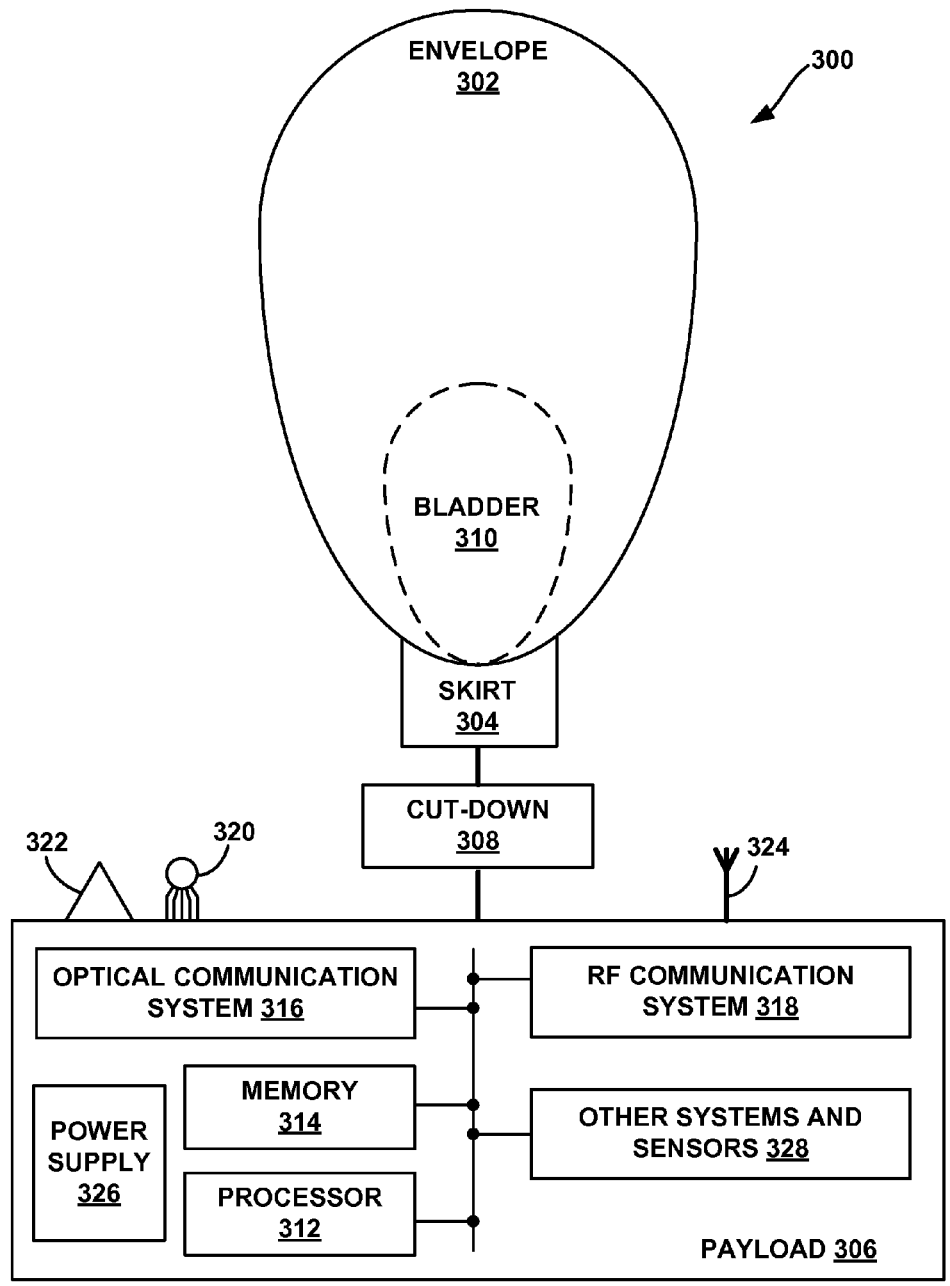
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 17 km and 22 km. FIG. 3 is a simplified block diagram illustrating a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 324. The payload 306 may also include a power supply 326 to supply power to the various components of balloon 300.

Further, payload 306 may include various types of other systems and sensors 328. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow air to escape from bladder 310.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

Note that movement and locations of balloons, such as balloon 300, can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able to find winds that will carry the balloon horizontally (e.g., latitudinally and/or longitudinally) to a desired horizontal location. Wind speed and/or direction may vary with altitude, and since current wind velocities as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

E. Example Heterogeneous Network

In some embodiments, a high-altitude-balloon network may include super-node balloons, which communicate with one another via optical links, as well as sub-node balloons, which communicate with super-node balloons via RF links. Generally, the optical links between super-node balloons have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
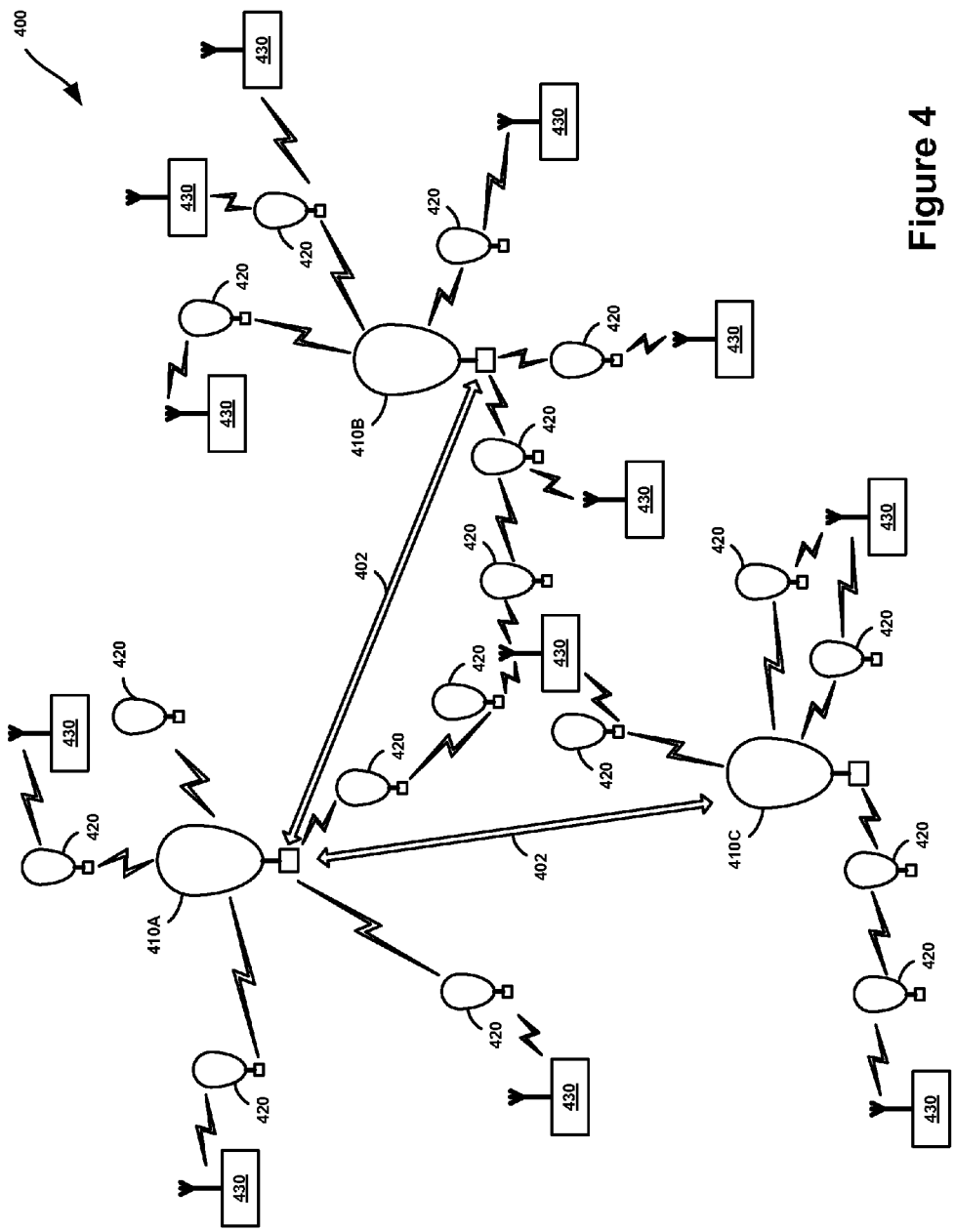
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an exemplary embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec.

A larger number of balloons may then be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to balloon network 400.

III. Example Adjustable Air-to-Ground Communication Beams

In some examples, a balloon's communication system may be capable of transmitting RF signals to ground-based stations and/or other ground subscribers using two or more different beam widths. For instance, a balloon may be equipped with a high-gain antenna capable of transmitting a narrow-beam signal as well as a low-gain antenna capable of transmitting a wide-beam signal. By using a broader beam width, a balloon may be able to reach ground subscribers within a larger area on the ground underneath the balloon. However, a broader beam may not provide as strong a communication signal as a narrow beam because the power may be dispersed over a greater area. In further examples, balloons may be equipped with more than two antennas, each capable of transmitting RF communication beams with different beam widths.

A balloon may then adjust the beam width of a ground-facing communication signal by selecting a different antenna to transmit an RF communication signal toward subscribers on the ground. For instance, a balloon using a high-gain antenna to transmit a narrow-beam signal may increase the beam width by switching to a low-gain antenna in order to cover a larger area on the ground. In further examples, a balloon may be equipped with a transceiver containing multiple antennas capable of transmitting RF communication signals with different beam widths in order to facilitate the process of adjusting beam width by switching between antennas.

In other examples, a balloon may be capable of transmitting an RF communication beam with a continuously adjustable beam width. For instance, the balloon may contain a ground-facing antenna that includes a radiating element situated to radiate toward a reflector. The reflector may be a dish, such as a quasi-parabolic dish that may be spherically invariant. The radiating element can emit signals toward the reflector, which results in radiation emitted from the antenna with a directional emission pattern. The directional emission pattern can be approximated as a cone-shaped region with an apex located near the antenna. The directivity of the emission pattern is thus determined by the breadth or narrowness of the region illuminated by the emission pattern, and can be characterized by an opening angle of the conical surface bounding the illuminated region. The opening angle (and thus the antenna directivity) may be determined, at least in part, by the separation distance between the radiating element and the reflector. Generally, a greater separation distance corresponds to a narrower emission pattern, whereas a lesser separation distance corresponds to a broader emission pattern. In this example, the width of the emission pattern may therefore be adjusted dynamically by moving the radiating element in the antenna closer or further from the reflector.

Figure 5B:
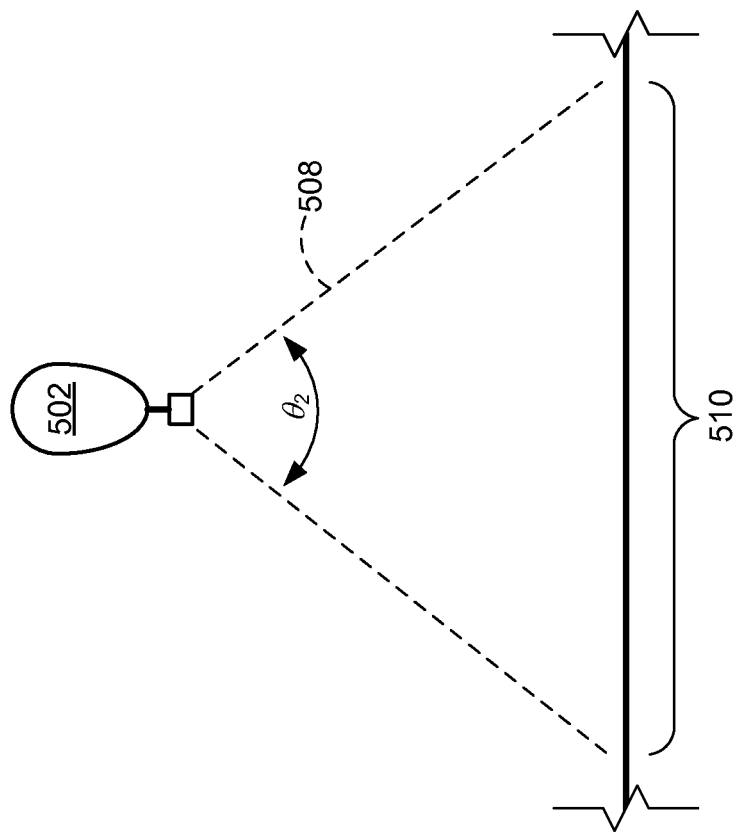
FIG. 5B shows a balloon and a communication signal with a second beam width, according to an example embodiment.
Figure 5A:
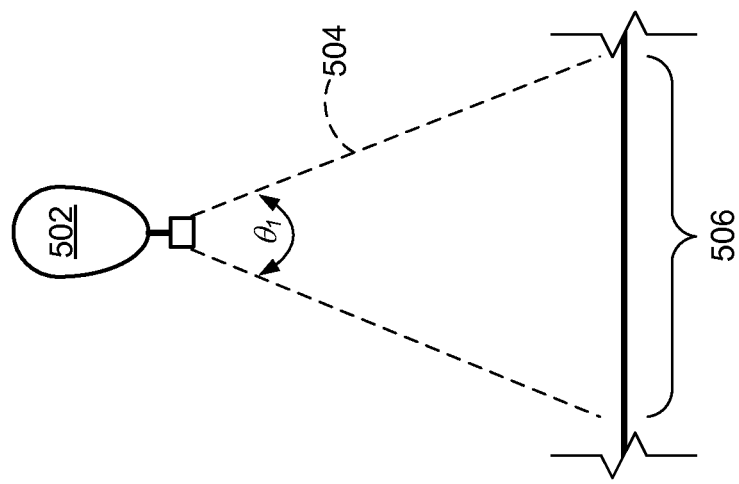
FIG. 5A shows a balloon and a communication signal with a first beam width, according to an example embodiment.

FIG. 5A illustrates an example high-altitude balloon 502 with a ground-facing antenna situated to illuminate a geographic region 506 at ground level. The balloon 502 can be similar to the balloon 300 described in connection with FIG. 3 and can include an RF communication system mounted to a payload for operating the ground-facing antenna, similar to the RF communication system 318 in the payload 306 of the balloon 300. The ground-facing antenna may emit an RF communication beam 504 that causes a signal at ground level that substantially spans the geographic region 506. The communication beam 504 may have an angular span $\theta_1$ that corresponds to the size of the geographic region 506 on the ground, such as a circumference of a circular region on the ground.

In some examples, the angular span of a balloon's communication beam may be adjusted in order to change the size of the geographic region reached by the beam at ground level. For instance, the balloon may be equipped with two or more RF antennas, each capable of transmitting RF communication beams with different beams. The beam width of a ground-facing RF communication beam may then be modified by switching between two different antennas. In some examples, multiple antennas may be incorporated within a single transceiver to facilitate switching between antennas (and communication beam widths). Or, in other examples, the balloon may be equipped with an RF antenna capable of transmitting a continuously adjustable RF communication signal.

FIG. 5B illustrates the balloon 502 transmitting a communication beam with a broader beam width than FIG. 5A. More specifically, the balloon 502 may illuminate the geographic region 510 by transmitting a communication beam 508 from a ground-facing antenna so as to substantially span the geographic region 510 at ground level. The communication beam 508 may have an angular span $\theta_2$ that corresponds to the size of the geographic region 510 on the ground. By increasing the width of the communication beam 508 and the corresponding angular span $\theta_2$, a greater area may be covered by the communication beam 508 at ground level. While the adjustable communication beams 504, 508 are described herein in connection with the high-altitude balloon 502 for purposes of convenience, it is specifically noted that a communication system with antenna(s) capable of transmitting RF communication beams with an adjustable beam width may be mounted to, and used in connection with, a variety of high altitude platforms, such as other lighter-than-air devices and the like.

Additionally, it is noted that the discussion herein generally refers to transmission of radio signals with adjustable beam widths (or emission patterns) to illuminate geographic regions (e.g., the geographic regions 506, 510 at ground level illuminated by the communication beams 504, 508). However, due to the general reciprocity between emission and reception of radio signals in antenna theory and design, it is recognized that the discussion throughout generally has equal application to the reception of signals from a particular ground-level geographic region. That is, the antenna(s) with adjustable beam widths may be used additionally or alternatively to receive signals arriving from the emission patterns (e.g., from within the geographic regions 506, 510 at ground level). In such an example, adjusting the beam width may allow a receiving antenna (mounted to the high-altitude balloon) to receive communication signals from ground-based stations and/or other ground subscribers from different geographical regions on the ground, such as shown in FIGS. 5A and 5B.

IV. Example Methods

Figure 6:
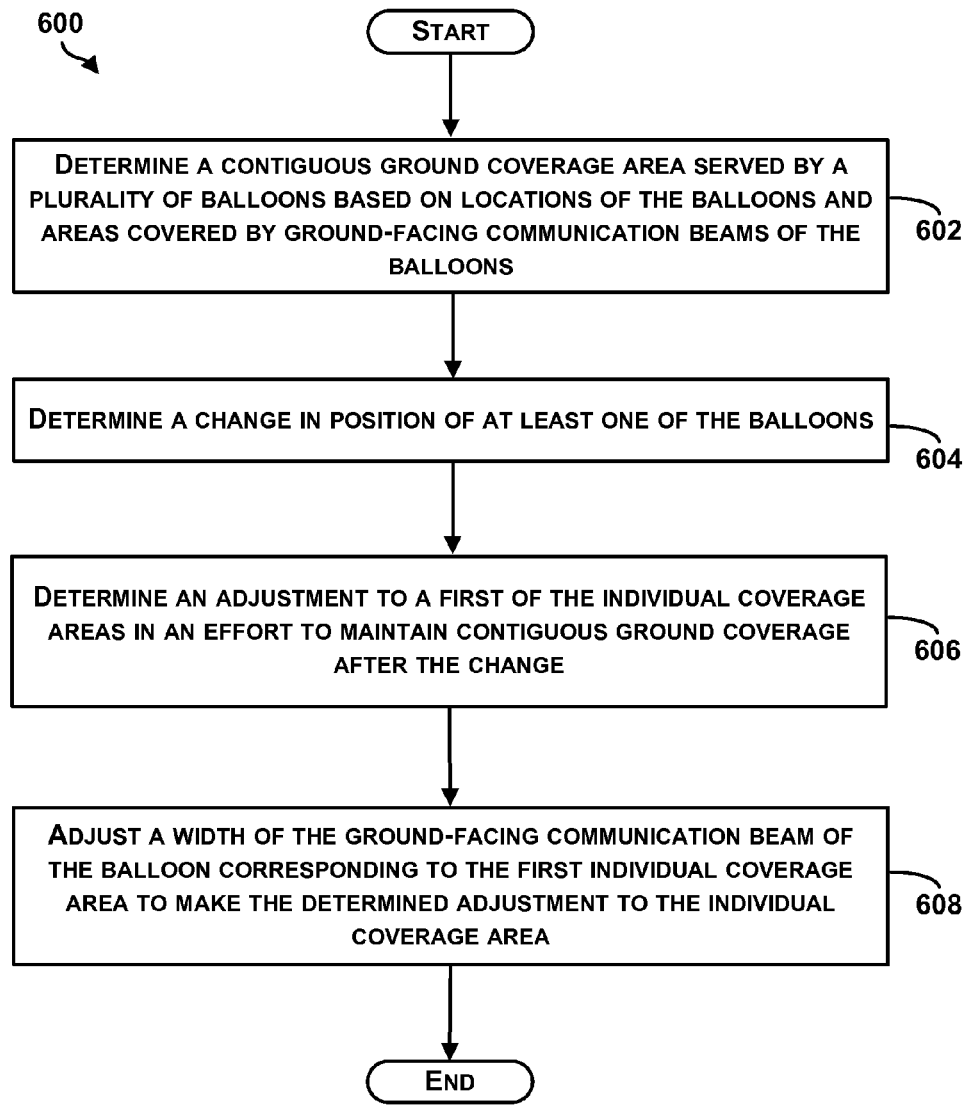
FIG. 6 is a block diagram of a method, according to an example embodiment.

FIG. 6 is a block diagram of a method, according to an example embodiment. The method 600 may be carried out by one or more computing systems located on an individual balloon and/or multiple balloons in communication with one another. In further examples, all or some of method 600 may be carried out by a control system of a balloon network. For example, some or all of method 600 may be carried out by a central control system and/or regional systems such as the ones described above with respect to FIG. 2. The control system(s) may communicate with the balloons within the balloon network. In some examples, the parts of the method 600 may be combined, separated into additional parts, and/or carried out in a different order than shown. Other configurations are also possible.

More specifically, the method 600 may initially involve determining a contiguous ground coverage area served by a group of balloons, as shown by block 602. A contiguous ground coverage area over a region may be formed by the individual coverage areas from each of the balloons within the region. Particular points within the ground coverage area may be served by at least one of the balloons so that the balloon can transmit and/or receive an RF communication signal which reaches the points at ground level.

For example, a particular balloon may cover a certain area on the ground located underneath the balloon (e.g., a circle on the ground with a center point directly under a horizontal position of the balloon in the air). The size of the area covered by a particular balloon may be based on the altitude of the balloon as well as the width of a ground-facing communication beam of the balloon. A broader beam width may cover a greater area on the ground. Additionally, a balloon higher in altitude may cover a greater area on the ground than a balloon lower in altitude, if both balloons are using the same beam width. In certain examples, balloons may be equipped with RF antennas that project a signal over an individual coverage area with a different shape besides a circle as well (e.g., an ellipse).

In some examples, when the individual coverage areas from each of the balloons are added together (e.g., when the circles on the ground are combined), a contiguous ground coverage area over a certain region may be formed. The ground coverage area may be contiguous in that it does not contain any gaps in coverage (e.g., points on the ground that are not served by any of the balloons). A contiguous ground coverage area could cover a particular geographical region, a city, or a country, for example.

In some examples, the contiguous ground coverage area may be determined by positioning balloons within a network at certain horizontal positions and/or altitudes, and then selecting beam widths for ground-facing communication signals from the balloons to cover an entire area. In other examples, the contiguous ground coverage area may be determined only by selecting beam widths for the communication signals, such as when the positions of the balloons are partially or totally uncontrollable by the balloon network. In certain examples, beam widths (and corresponding individual coverage areas) may be chosen to provide contiguous coverage over the region with a minimal amount of overlap between individual coverage areas. In other examples, multiple balloons may cover certain overlapping areas on the ground for redundancy benefits.

FIG. 7A illustrates a top view of an example configuration of three balloons and corresponding individual coverage areas. More specifically, a first balloon 702 may be equipped with a communication system 704 that includes a ground-facing RF antenna that may project an RF communication signal over the area 706 on the ground underneath the balloon 702. Additionally, a second balloon 708 may be equipped with a communication system 710 that includes a ground-facing RF antenna that may project an RF communication signal over a different area 712 on the ground. Furthermore, a third balloon 714 may be equipped with a communication system 716 that includes a ground-facing RF antenna that may project an RF communication signal over another different area 718 on the ground.

A contiguous ground coverage area may then be formed by the regions 706, 712, 718. Any point on the ground within the coverage area may be covered by at least one of the balloons 702, 708, 714. In this simplified example, three balloons are shown, but a ground coverage area could include individual coverage areas from hundreds or thousands of balloons within a network, as well. Additionally, the communication systems 704, 710, 716 of the balloons may all be the same in some examples, or they may be different on different balloons in other examples as well.

In further examples, a ground coverage area may include different levels of coverage to different parts of a region based on demand level. For instance, certain areas may have denser populations or greater service demands for other reasons. Each balloon may have a limit on the capacity of data that it can transmit to ground subscribers (e.g., 1 MB/s, 10 MB/s, or 100 MB/s). Accordingly, in some examples, a certain number of balloons may be positioned over a region in order to satisfy the demands within the region at ground level. A sufficient level of coverage may therefore be provided by a balloon network to meet the different demands of each section of the ground coverage area.

The method 600 may then involve determining a change in position of at least one of the balloons, as shown by block 604. More specifically, the horizontal (latitudinal and/or longitudinal) position and/or altitude of individual balloons within a network may change over time. For instance, wind or other environmental factors may cause balloons to change position. Additionally, in some examples, individual balloons may periodically be assigned to relocate to different areas for purposes of providing coverage and/or for other tasks.

In some instances, movements of one or more balloons within the network may be expected to cause a gap in coverage at ground level. For instance, a balloon that was the only balloon providing coverage to a particular area directly under the balloon may be blown in a horizontal direction so that the balloon is no longer over the particular area and no longer provides coverage to the area using its current ground-facing beam width. In some examples, a prediction about a possible gap in coverage may be made in advance based on expected balloon movements (e.g., a weather forecast may predict wind in a particular direction). In other examples, the prediction may occur partway through balloon movements or after certain balloon movements have already occurred as well.

FIG. 7B shown an example configuration of the three balloons from FIG. 7A where one of the balloons has moved horizontally. More specifically, balloon 714 may have moved to the right so that the area 706 on the ground covered by the balloon 702 no longer touches the area 718 covered by the balloon 714. In such a circumstance, a gap in the ground coverage area may occur in between the balloon 702 and the balloon 714. In some examples, a determination may be made that a gap may occur before the balloon 714 has started to move or while the balloon 714 is partway through a change in position as well.

The method 600 may then involve determining an adjustment to an individual coverage area of one of the balloons in an effort to maintain contiguous ground coverage, as shown by block 606. More specifically, a beam width of one or more of the balloons may be increased or decreased in order to preserve contiguous ground coverage after one or more of the balloons have changed position. By increasing the beam width of a particular balloon, the individual coverage area of the balloon (e.g., the circle on the ground)

may be increased, such as to prevent a gap in coverage on the ground that may otherwise occur.

In some examples, a minimal increase in an individual coverage area of a balloon may be determined in order to maintain contiguous ground coverage. For instance, the individual coverage area of a balloon may not be increased any more than necessary in order to avoid reducing the signal strength at ground level. In other examples, the individual coverage areas of multiple balloons may be adjusted. For instance, the coverage areas of two or three different balloons may each be increased in order to prevent a possible gap in coverage. In certain examples, individual coverage areas of some balloons may be increased while individual coverage areas of other balloons may be decreased as well.

The method 600 may further involve adjusting a width of the ground-facing communication beam of the balloon in order to adjust the individual coverage area of the balloon, as shown by block 608. More specifically, the individual coverage area of the balloon may be adjusted as previously determined by adjusting the balloon's beam width in order to maintain contiguous ground coverage after one or more of the balloons change position. In some examples, an adjustment to a beam width of the communication signal from one of the balloons may be completed before the balloons have changed position to a point where a gap in service to the area may occur.

The beam width of a ground-facing communication beam of a balloon may be adjusted using any of the methods described above. For instance, a balloon's communication system may switch between two or more RF antennas, each capable of transmitting a signal with a different beam width. Or a balloon may be equipped with an antenna with a continuously adjustable beam width, in which case the beam width may be adjusted by adjusting the spacing between a radiator and a ground-facing reflector, for example.

FIG. 7C shows another configuration of the three balloons from FIG. 7B. More specifically, the beam width of the balloon 714 may be increased in order to cover a larger area 718 at ground level. By increasing the individual coverage area 718 of the balloon 714, any gap in coverage that may have occurred as a result of the change in position of the balloon 714 may be avoided. In other examples, the individual coverage area 706 of the balloon 702 or the individual coverage area 712 of the balloon 708 may be increased instead in order to maintain contiguous coverage. In further examples, a combination of the individual coverage areas 706, 712, and 718 may also be increased in order to avoid a gap in coverage.

In certain examples, different sections of a ground coverage area may be associated with different levels of demand from ground subscribers as previously noted. In such examples, contiguous ground coverage may therefore be defined as a level of coverage that meets the level of demand over an entire region. For instance, an adjustment to an individual coverage area of a balloon may be determined as part of Method 600 in an effort to avoid an insufficient level of service to a particular region (in addition to or instead of a literal gap in coverage). For example, the demand level of a particular area may require service from at least two balloons. In such an example, if one of the balloons moves horizontally away from the area (e.g., as in FIG. 7B), the beam width of the balloon or a different balloon may be increased in order to ensure that the area continues to have a sufficient level of service at ground level.

In other examples, a change in position of one or more balloons may include a change in altitude. If a balloon rises in altitude, the individual ground coverage area of the balloon may increase, assuming a fixed beam width. Similarly, if the balloon decreases in altitude, the individual ground coverage area of the balloon may decrease, assuming a fixed beam width. In some examples, changes in altitude of one or more of the balloons in an area may therefore be expected to cause a gap in the coverage provided by a group of balloons at ground level.

In certain examples, the beam width of a balloon may be adjusted in order to keep the individual coverage area of the balloon on the ground fixed or at least approximately fixed as the balloon changes in altitude. For instance, as a balloon increases in altitude, the angular span of a ground-facing communication beam may be narrowed so that the beam spans roughly the same area at ground level. Additionally, as the balloon decrease in altitude, the angular span of a ground-facing communication beam may be broadened so that the beam spans roughly the same area at ground level. In some examples, a balloon's antenna can be configured such that the emission patterns at least approximately span the same ground level geographic region regardless of the elevation of the balloon. Thus, the balloon can be configured to maintain communication with a substantially fixed geographic region even as the balloon ascends and descends to various elevations.

Moreover, a narrower ground-facing communication beam may have a greater directional gain. As such, the increased directional gain of the beam's emission pattern may at least partially compensate for the greater distance between the balloon and the ground level when the balloon is at a higher altitude. For example, the radiation at ground level in the covered geographic region may have comparable intensity whether from a broader emission pattern with the balloon at a lower altitude or from a narrower emission pattern with the balloon at a higher altitude. The more directed emission pattern from a balloon at a higher altitude may thereby at least partially compensate for the altitude-dependent variations in radiation intensity at ground level.

Figure 7D:
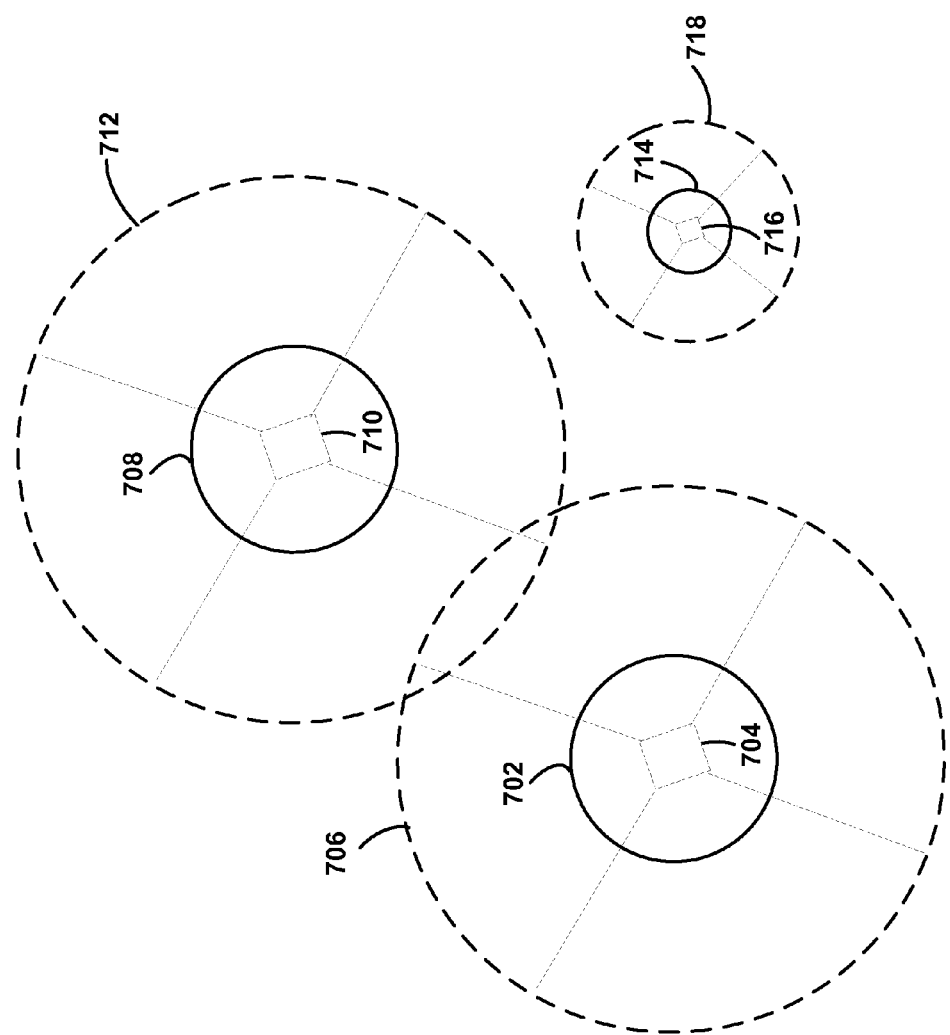
FIG. 7D illustrates a top view of a further configuration of three balloons and corresponding communication beams, according to an example embodiment.

FIG. 7D shows a top view of an example configuration of three balloons, with one balloon lower in altitude than the other two balloons. More specifically, balloon 714 may change position by decreasing in altitude relative to balloons 702 and 708. If the beam width of the ground-facing communication beam from the communication system 716 of the balloon 714 is kept fixed, the individual coverage area 718 of the balloon at ground level may decrease in size. In some examples, the change in altitude of the balloon 714 may be expected to cause a gap in ground coverage, such as in the section of the ground between the area 706 covered by the balloon 702 and the area 718 covered by the balloon 714.

In order to maintain contiguous ground coverage, the beam width of the balloon 714 may be adjusted to account for the change in altitude of the balloon 714. In particular, in some examples, the beam width of the balloon 714 may be adjusted in order to keep the individual coverage area 718 of the balloon 714 relatively fixed in size regardless of the current altitude of the balloon 714. As the altitude of the balloon 714 increases, the beam width may be narrowed in order to keep the ground coverage area 718 from increasing in size. Additionally, as the altitude of the balloon 714 decreases, the beam width may be widened in order to keep the ground coverage area 718 from decreasing in size.

Figure 7E:
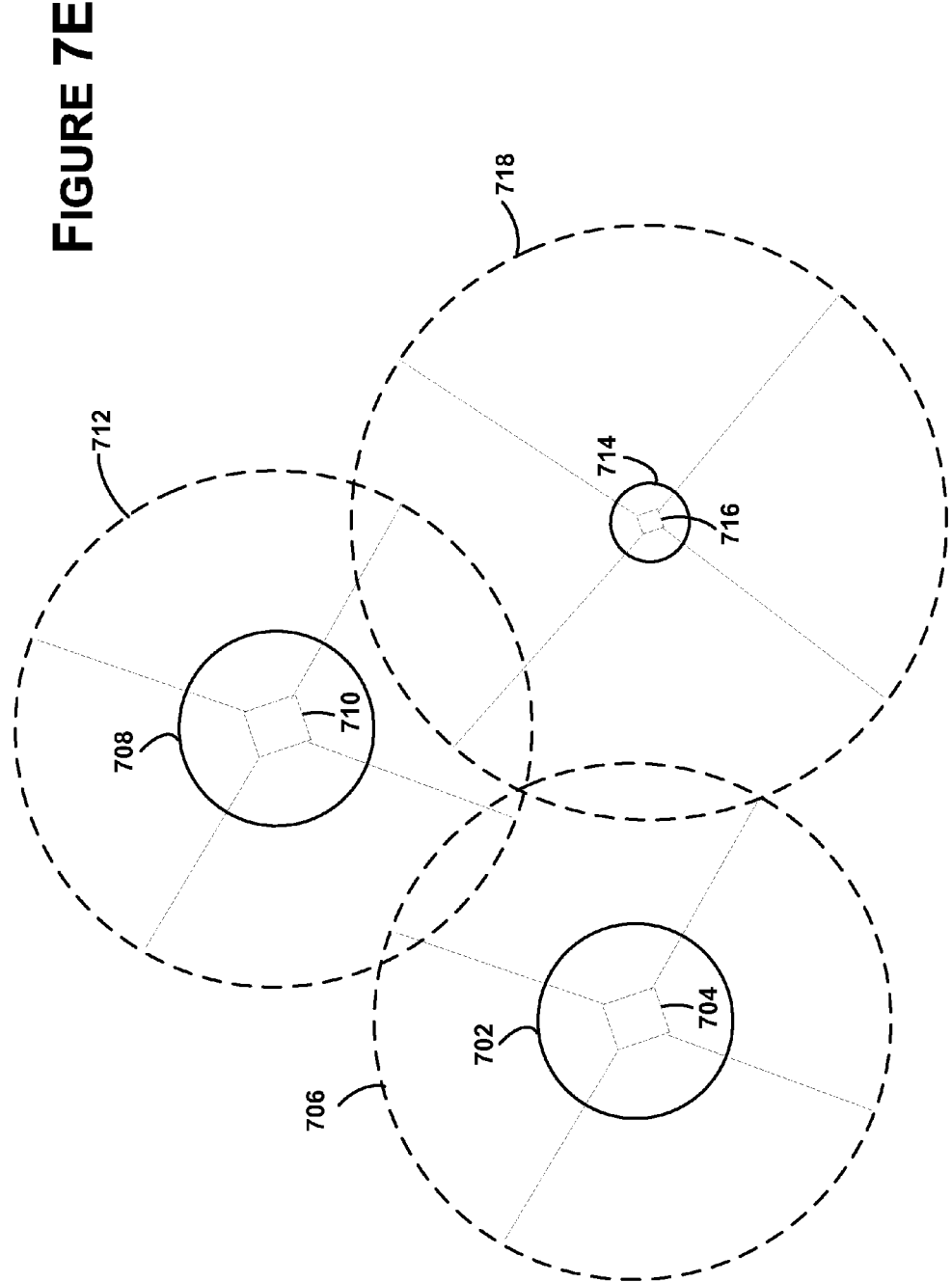
FIG. 7E illustrates a top view of an additional configuration of three balloons and corresponding communication beams, according to an example embodiment.

FIG. 7E illustrates a top view of another example configuration of the balloons from FIG. 7D. More specifically, the beam width of the ground-facing communication beam from the communication system 716 on the balloon 714 may be increased in order to keep the ground coverage area 718 of the balloon 714 from decreasing in size as the balloon 714 drops in altitude. In some examples, adjustments to the beam width of the balloon 714 may be made far enough in advance of any changes in altitude by the balloon 714 that contiguous coverage on the ground from the group of balloons may be maintained. In other examples, beam widths of balloon 702 and/or balloon 708 may be adjusted as well or instead in an effort to maintain contiguous coverage as the balloon 714 changes altitude.

In some examples, balloons may generally operate between a first altitude near a low end of a desired stratospheric altitude for a high-altitude balloon (e.g., 18 km), and a second altitude near a high end of a desired stratospheric altitude for a high-altitude balloon (e.g., 25 km). In order to maintain a relatively constant coverage area on the ground as a balloon changes altitude from the first altitude to the second altitude, the angular span of an example emission pattern at the first altitude can be approximately 90° (e.g., an approximately conical radiation pattern with a 45° half-width), and the angular span of an example emission pattern at the second altitude can be approximately 70° (e.g., an approximately conical radiation pattern with a 36° half-width).

In a further example, beam widths of ground-facing communication signals from balloons can be adjusted to account for variations in ground-level elevation. For example, a balloon can include an antenna with an emission pattern that is adjusted based on the altitude of the balloon, relative to ground level immediately below the balloon. In other words, the emission pattern can be adjusted based on the absolute altitude, relative to sea-level, such as detected by ambient pressure, and can additionally or alternatively be adjusted based on altitude, relative to ground. Thus, the balloon may be configured to at least partially compensate for variations in relative altitude (e.g., due to the balloon passing over regions with variations in ground level altitude) in order to maintain an at least approximately constant geographic span and/or intensity level of radiation reaching ground level. In one example, the balloon may traverse over a region with a series of ground elevation changes (e.g., hills, valleys, slopes, flat areas, mountains, etc.). An example balloon may dynamically adjust the radiation pattern of its ground-facing antenna to at least partially compensate for altitude-dependent variations in the radiation that reaches the ground from the balloon. For example, the emission pattern may be relatively broad while over a high elevation region (and low relative altitude). Similarly, the emission pattern may be relatively narrow while over a low elevation region (and high relative altitude).

In some examples, the relative altitude (i.e., distance from ground to balloon) can be determined by predetermined ground-level elevation data in combination with position information (e.g., as determined by a GPS receiver or the like) and one or more altitude sensors on the balloon (e.g., altimeters and/or pressure sensors and the like). Upon determining position information for the balloon, such as latitude and longitude coordinates, a mapping database can be accessed to determine a corresponding ground level elevation immediately below the balloon. The ground-level elevation, which can be determined by a computer system on the balloon (e.g., similar to the computer system 312 in the payload 306 of the balloon 300) and/or by a remote server in communication with the balloon, can then be combined with the altitude of the balloon as determined via the on-board sensors to determine the distance from the balloon to the ground (i.e., the relative altitude). In other examples, the balloon may include sensors configured to directly sense and/or determine the relative altitude of the balloon, such as downward facing radar and the like.

In a further example, the beam width of a balloon can be adjusted to account for influences on the radiation from the balloon due to atmospheric effects, such as weather patterns in the troposphere. As an example, particular portions of the spectrum may be sensitive to inclement weather due to increases in radiation attenuating water vapor and/or droplets in the troposphere, for example. To achieve a desired radiation intensity at ground level (e.g., a minimum signal to noise ratio), the emission pattern may be narrowed in response to detecting certain weather patterns. In other words, the radiation pattern may be narrowed so as to increase the directional gain in the illuminated region at ground level, to account for radiation attenuating weather patterns in the atmosphere between ground level and the high-altitude balloon. In some examples, such weather-related effects can be accounted for by systems that dynamically detect weather patterns and communicate accordingly with the balloon. In other examples, such weather-related effects can be detected directly via sensors on the balloon. Additionally or alternatively, such weather conditions (and/or other signal degrading phenomena) can be inferred through detection of degradation in signal strength at stations at ground-level. In other words, the signal-to-noise ratio (or other measure of signal strength) at ground-based stations can be used as feedback information to dynamically adjust the emission pattern, and thus the directional gain, of a ground-facing antenna on the balloon.

In other examples, adjustments to beam widths of ground-facing communication beams on one or more balloons may be made based on multiple simultaneous changes in position of balloons, possibly including both horizontal changes in position and changes in altitude. For instance, rather than keeping the coverage area of an individual balloon relatively constant as the balloon changes in altitude, beam widths of other neighbouring balloons may instead be increased or decreased in order to maintain contiguous coverage or a desired level of coverage to certain regions. A control system may leverage disclosed systems and methods in order to adjust beam widths of ground-facing communication signals from balloons in more complex networks as well, including networks that contain hundreds or thousands of balloons.

V. Conclusion

The examples given in the preceding sections are meant for purposes of explanation and are not meant to be limiting. Other types of balloons and/or balloon networks may benefit from the disclosed systems and methods for adjusting ground-facing RF communication beam widths as well, without departing from the spirit or scope of the subject matter presented herein.

Further, the above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

I claim:

1. A computer-implemented method, comprising:
determining, based on respective locations of a plurality of balloons and areas covered by respective ground-facing communication beams of the balloons, a contiguous ground coverage area served by the plurality of balloons, wherein the ground-facing communication beam of a first balloon of the plurality defines a first individual coverage area within the contiguous ground coverage area;
determining an increase in a horizontal distance between the first balloon and a second balloon of the plurality of balloons;
based on the increase in the horizontal distance between the first balloon and the second balloon, identifying a gap in the contiguous ground coverage area between the first balloon and the second balloon; and
in response to identifying the gap in the contiguous ground coverage area between the first balloon and the second balloon, adjusting a continuously adjustable antenna to cause a communication system of the first balloon to transmit a wider ground-facing communication beam in order to expand the first individual coverage area to cover the gap in the contiguous ground coverage area, wherein adjusting the continuously adjustable antenna comprises adjusting a separation distance between a radiator and a ground-facing reflector that is configured to reflect the wider ground-facing communication beam toward a ground surface.

2. The method of claim 1, wherein the increase in the horizontal distance comprises an expected future increase.

3. The method of claim 1, further comprising determining a demand level of a plurality of ground subscribers, wherein:
coverage provided by the contiguous ground coverage area satisfies the demand level before the increase in the horizontal distance between the first balloon and the second balloon; and
the expansion of the first individual coverage area is determined in an effort to maintain coverage that satisfies the demand level after the increase in the horizontal distance between the first balloon and the second balloon.

4. A system, comprising:
a plurality of balloons; and
a control system configured to:
determine, based on respective locations of the balloons and areas covered by respective ground-facing communication beams of the balloons, a contiguous ground coverage area served by the balloons, wherein the ground-facing communication beam of a first balloon of the plurality defines a first individual coverage area within the contiguous ground coverage area;
determine an increase in a horizontal distance between the first balloon and a second balloon of the plurality of balloons;
based on the increase in the horizontal distance between the first balloon and the second balloon, identify a gap in the contiguous ground coverage area between the first balloon and the second balloon;
and
in response to identifying the gap in the contiguous ground coverage area between the first balloon and the second balloon, adjust a continuously adjustable antenna to cause a communication system of the first balloon to transmit a wider ground-facing communication beam in order to expand the first individual coverage area to cover the gap in the contiguous ground coverage area, wherein adjusting the continuously adjustable antenna comprises adjusting a separation distance between a radiator and a ground-facing reflector that is configured to reflect the wider ground-facing communication beam toward a ground surface.

5. The system of claim 4, wherein the increase in the horizontal distance comprises an expected future increase.

6. The system of claim 4, wherein the control system is further configured to determine a demand level of a plurality of ground subscribers, wherein:
coverage provided by the contiguous ground coverage area satisfies the demand level before the increase in the horizontal distance between the first balloon and the second balloon; and
the expansion of the first individual coverage area is determined in an effort to maintain coverage that satisfies the demand level after the increase in the horizontal distance between the first balloon and the second balloon.

7. A non-transitory computer readable medium having stored therein instructions, that when executed by a computing system, cause the computing system to perform functions comprising:
determining, based on respective locations of a plurality of balloons and areas covered by respective ground-facing communication beams of the balloons, a contiguous ground coverage area served by the plurality of balloons, wherein the ground-facing communication beam of a first balloon of the plurality defines a first individual coverage area within the contiguous ground coverage area;
determining an increase in a horizontal distance between the first balloon and a second balloon of the plurality of balloons;
based on the increase in the horizontal distance between the first balloon and the second balloon, identifying a gap in the contiguous ground coverage area between the first balloon and the second balloon; and
in response to identifying the gap in the contiguous ground coverage area between the first balloon and the second balloon, adjusting a continuously adjustable antenna to cause a communication system of the first balloon to transmit a wider ground-facing communication beam in order to expand the first individual coverage area to cover the gap in the contiguous ground coverage area, wherein adjusting the continuously adjustable antenna comprises adjusting a separation distance between a radiator and a ground-facing reflector that is configured to reflect the wider ground-facing communication beam toward a ground surface.

8. The non-transitory computer readable medium of claim 7, wherein the increase in the horizontal distance comprises an expected future increase.

9. The method of claim 1, further comprising:
determining that one or more balloons of the plurality of balloons traveled closer to the first balloon; and
based on determining that the one or more balloons of the plurality of balloons traveled closer to the first balloon, causing the communication system of the first balloon to transmit a narrower ground-facing communication beam in order to contract the first individual coverage area.

10. The method of claim 1, wherein identifying the gap in the contiguous ground coverage area between the first balloon and the second balloon comprises:
determining that the first individual coverage area and a second individual coverage area defined by a second ground-facing communication beam of the second balloon overlapped before the increase in the horizontal distance between the first balloon and the second balloon; and
determining that the first individual coverage area and the second individual coverage area no longer overlap after the increase in the horizontal distance between the first balloon and the second balloon.

* * * * *